United States Patent
Mildner et al.

(10) Patent No.: US 9,056,635 B2
(45) Date of Patent: Jun. 16, 2015

(54) SUBSTRUCTURE FOR A MOTOR VEHICLE

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/335,629

(22) Filed: Jul. 18, 2014

(65) Prior Publication Data

US 2015/0021952 A1  Jan. 22, 2015

(30) Foreign Application Priority Data

Jul. 18, 2013 (DE) .................... 10 2013 011 961

(51) Int. Cl.
    *B62D 25/20* (2006.01)
(52) U.S. Cl.
    CPC ..................... *B62D 25/20* (2013.01)
(58) Field of Classification Search
    CPC ........................................................ B65D 25/20
    USPC ................. 296/187.08, 193.07, 209, 204
    See application file for complete search history.

(56) References Cited

U.S. PATENT DOCUMENTS

| | | | |
|---|---|---|---|
| 6,234,568 B1 | 5/2001 | Aoki | |
| 6,971,709 B2 * | 12/2005 | Haewoong | 296/203.04 |
| 7,635,158 B2 * | 12/2009 | Park | 296/203.04 |
| 2002/0043814 A1 * | 4/2002 | Weiman | 296/29 |
| 2002/0163226 A1 * | 11/2002 | Shibata | 296/203.02 |
| 2006/0202519 A1 | 9/2006 | Latimer, III et al. | |
| 2011/0272969 A1 * | 11/2011 | Mori | 296/193.07 |
| 2013/0221709 A1 | 8/2013 | Mildner | |

FOREIGN PATENT DOCUMENTS

| | | | |
|---|---|---|---|
| DE | 4414472 A1 * | 11/1995 | ............ B62D 21/02 |
| DE | 19714631 A1 | 10/1997 | |
| DE | 102005031730 A1 | 4/2007 | |
| DE | 102006052355 A1 | 5/2008 | |
| DE | 102012008025 A1 | 10/2013 | |
| EP | 1640252 A1 | 3/2006 | |
| JP | 2000016343 A | 1/2000 | |
| JP | 2005219608 A | 8/2005 | |
| JP | 2007131148 A | 5/2007 | |
| KR | 20000013232 A | 3/2000 | |

OTHER PUBLICATIONS

UKIPO, British Search Report for British Application No. 1412105.7, dated Jan. 13, 2015.

* cited by examiner

*Primary Examiner* — Pinel Romain
(74) *Attorney, Agent, or Firm* — Ingrassia Fisher & Lorenz PC

(57) ABSTRACT

A substructure for a motor vehicle has a first side member including an upper shell and a lower shell, which crosses a rear axle and extends at least as far as to under a passenger cell. In a transition region between the rear axle and the passenger cell, the side member includes at least one wall part which is fastened to the upper and the lower shell in a material-doubling manner.

13 Claims, 3 Drawing Sheets

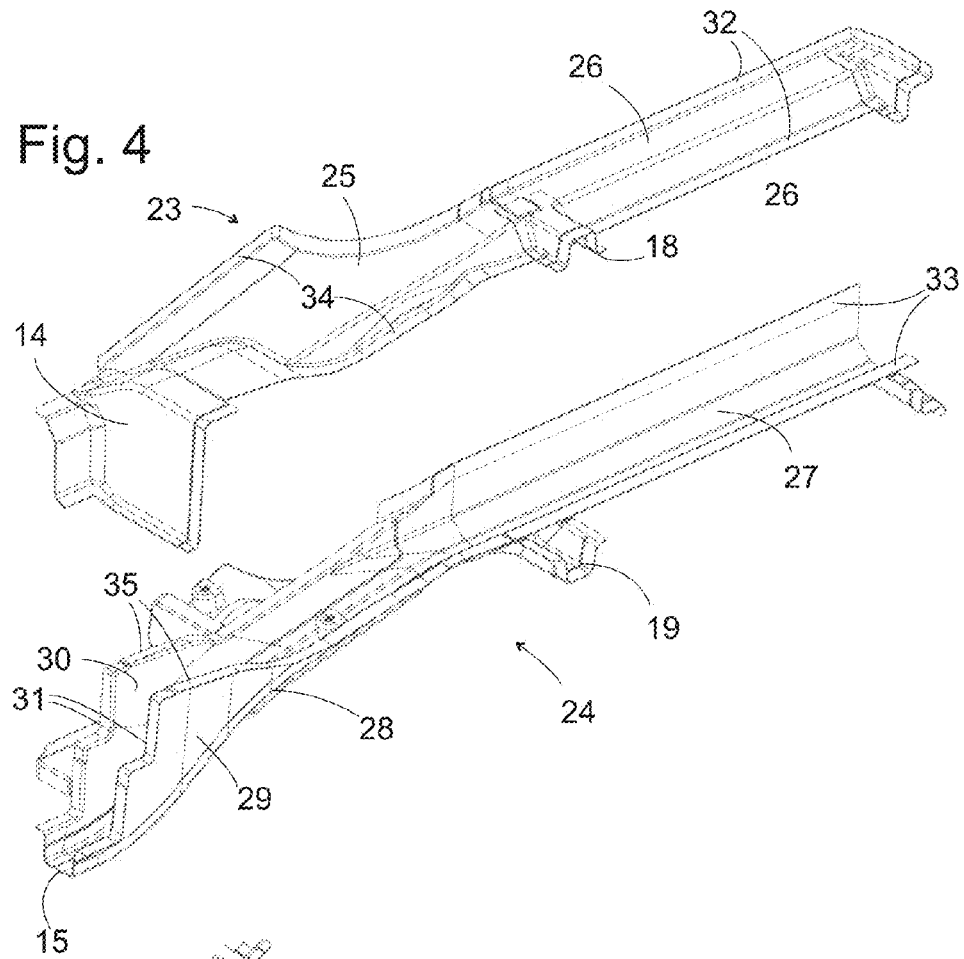
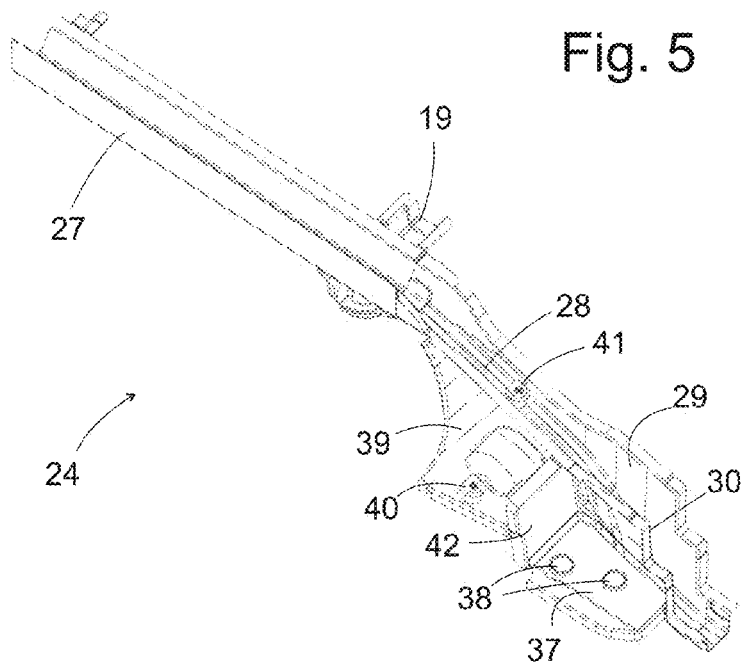

SUBSTRUCTURE FOR A MOTOR VEHICLE

CROSS REFERENCE TO RELATED APPLICATION

This application claims priority to German Patent Application No. 102013011961.8 filed Jul. 18, 2013, which is incorporated herein by reference in its entirety.

TECHNICAL FIELD

The technical field relates to a motor vehicle body structure and more particularly to a substructure for a motor vehicle with a side member that is joined together from an upper and a lower shell.

BACKGROUND

In the manner that is customary in this field, the side member of this substructure has a rear portion, which extends horizontally in vehicle longitudinal direction along a stowage space of the vehicle, a first portion, which crosses under the passenger cell of the vehicle substantially linearly, and a second portion, which connects the two aforementioned portions to one another and runs obliquely to the vehicle longitudinal direction in a transition region between the rear axle of the vehicle and the passenger cell.

When the vehicle is involved in a collision and the side member has to absorb high forces in vehicle longitudinal direction, this oblique transition region is subjected to particularly high loads. In order to prevent the side member from initially giving way to the load in this transition region, a solution has been to more robustly construct this region than the portions of the side member before it and after it oriented in vehicle longitudinal direction. Such a structure which is variable across the side member can be readily realized by using deep-drawn upper and lower shells; since however the wall thickness of the shells is predetermined within narrow limits by the sheet metal used as source material during the deep-drawing, a higher load capacity of the side member in the transition region can substantially be achieved only through an enlarged cross section, through which room in the stowage space or in the passenger cell is lost.

SUMMARY

An object of a configuration of the present disclosure is to state a substructure for a motor vehicle, with which a high load capacity of the side member in the transition region between rear axle and passenger cell with compact cross section can be achieved.

According to a configuration of the present disclosure this object is solved in that with a substructure for a motor vehicle with a first side member including an upper and a lower shell, which crosses a rear axle and substantially extends as far as to under a passenger cell, the side member in a transition region between the rear axle and the passenger cell includes at least one wall part, which is fastened on the upper and the lower shell in a material-doubling manner. Material-doubling offers the possibility to modulate the overall wall thickness of the side member and reinforce regions which are subjected to high loads by placing material of a shell and of the wall part on top of one another. The doubled wall thickness in the regions of the shells and of the wall part fastened to one another supplies a high load capacity of the transition region with low cross section of the side member.

The load capacity of the transition region can be further increased in that at least one of the shells and the wall part each have an elongated curvature zone and the wall part is fastened to the shell on both sides of the curvature zones. The region of doubled wall thickness thus extends on both sides of the curvature zone and is additionally stiffened structurally through these. If the one shell has a U-shaped cross section with two legs and a bottom wall connecting the legs, the abovementioned curvature zone of the shell can in particular extend between one of the legs and the bottom wall. A second curvature zone between the bottom wall and the other leg is then appropriate for mounting a second wall part.

According to a configuration of the present disclosure, the wall part includes an upright wall surface and flanges which are angled from the upright wall surface on an upper and a lower edge in opposite directions. The curvature zone of the wall part can then extend between the upright wall surface and one of the flanges. The different orientation of the flanges simplifies the step-by-step assembly of the member, for example in that initially the wall part on both sides of the curvature zone is joined to the one shell and subsequently the remaining free flange of the wall part is joined to the second shell.

The shell having the curvature zone is preferably the lower shell and a lower flange of the wall part to be connected to the lower shell runs, following the lower shell, declivitously (i.e., slopes) in vehicle longitudinal direction towards the front. The upper flange can be less declivitous than the lower one, it can even run horizontally so that the wall part between its flanges diverging towards the front includes a front edge. A front edge of the wall part can be utilized in order to join a heel plate thereon, which forms a rearward termination of the passenger cell.

At least one first one of the shells can include at least one deep-drawn part, on which the wall part is fastened. The deep-drawn part can form the entire first shell; a higher flexibility in the production can be achieved however if the first shell furthermore includes at least one roll-formed part oriented in vehicle longitudinal direction. Such a multi-piece construction of the shell allows keeping the dimensions of the deep-drawn parts small, so that accordingly small and cost-effective tools can be used for the deep-drawing. In order to be able to cost-effectively produce vehicle substructures for different vehicle models, which differ in particular in their length, different models of deep-drawn parts can be combined with same roll-formed parts or roll-formed parts which merely differ in their length and can therefore be cost-effectively produced by cutting endless material to size. The roll-formed part can be joined in particular to a rear connection of the deep-drawn part and extend as far as to behind the rear axle.

Analogously, the second shell can also include a deep-drawn part and a roll-formed part, wherein the roll-formed parts of the two shells can be joined together into a hollow profile. The deep-drawn part of the first shell can furthermore include a front connection, to which the roll-formed part is joined, in order to extend below the passenger cell from there. Naturally, roll-formed parts can also be attached both to a front and a rear connection of the deep drawn part. Preferentially, a second side member is formed in mirror image with respect to the first side member, and the side members are interconnected into a ladder-like structure via cross members.

By using roll-formed parts also for the cross members it is easily possible to provided cross members with same cross sections in different lengths and thus produce body substructures in different widths rationally using numerous identical parts.

Further features and advantages of the present disclosure are obtained from the following description of exemplary embodiments making reference to the attached figures. It shows:

BRIEF DESCRIPTION OF THE DRAWINGS

The present disclosure will hereinafter be described in conjunction with the following drawing figures, wherein like numerals denote like elements, and:

FIG. 4 shows the side member, expanded into an upper shell and a lower assembly;

FIG. 5 shows the lower assembly of the side member, seen from another perspective;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
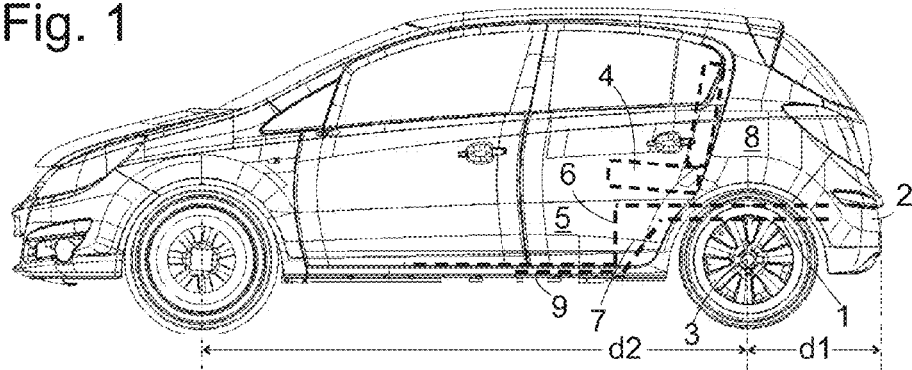
FIG. 1 shows a lateral view explaining the placement of parts of the substructure according to the present disclosure in a vehicle.
Figure 2:
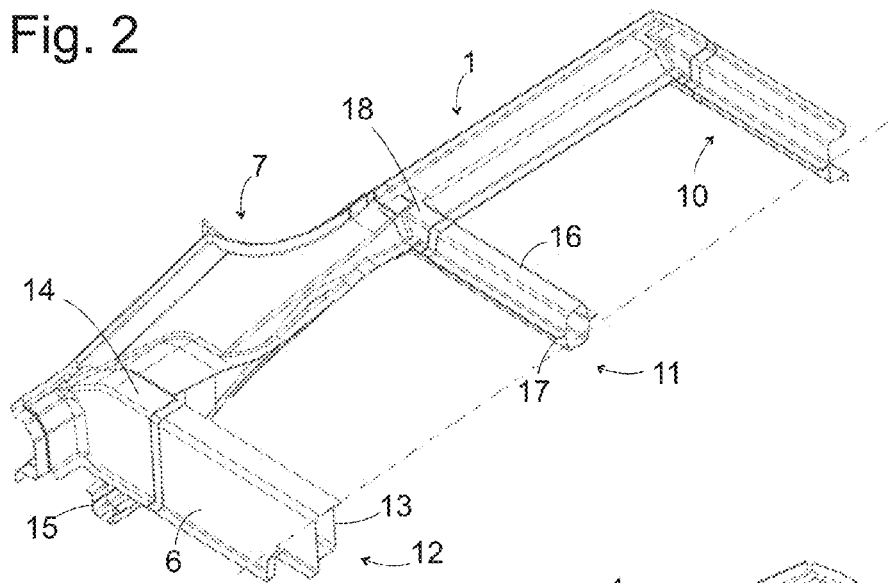
FIG. 2 shows a perspective view of a substructure halved along the longitudinal center plane of the vehicle.

FIG. 1 shows a lateral view of a motor vehicle, in which a substructure according to the present disclosure can be used. The substructure which is concealed in the interior of the vehicle includes two side members, which run along in mirror image with respect to one another on the right and left flank of the vehicle and the course of which is illustrated in FIG. 1 by interrupted lines in a rear part of the vehicle. The side members extend over the entire length of the vehicle, from a front as far as to a rear bumper, but their course in the front part of the vehicle is not shown since not substantial to the present disclosure. The part of one of the side members shown in FIG. 1 is divided into a rear side member portion 1, a transition portion 7 and a middle side member portion 9. The rear side portion 1 extends from a rear bumper 2 substantially horizontally towards the front. On the other side of a rear axle 3 a transition portion 7 follows, which extends to as far as under seats 4 in a passenger cell 5 of the vehicle and the top side of which horizontally extends to that of the rear bumper portion 1 horizontally towards the front. The lower side of the transition portion 7 is declivitous or slopes towards the front in order to form a connection to a middle side member portion 9, which extends from under the passenger cell 5 towards the front. On a front edge of the transition portion 7 a heel plate 6 is mounted below a front edge of the seats 4.s FIG. 2 shows in a perspective view a rear region of the substructure of the body from FIG. 1. The view shows a part of the body with respect to the travelling direction, right side member with portions 1, 7 and, each halved along the longitudinal center plane, three cross members 10, 11, 12 connecting the side members to one another. The cross members 10, 11, 12 are each joined together from two plates welded together along their edges. In the case of the front-most cross member 12, one of these plates is the heel plate 6. A roll-formed profile 13 is joined to the back of the heel plate 6 and welded with the latter into a hollow profile with closed cross section. The right end of the cross member 12 is concealed by an attachment piece 14 of the transition portion 7. Below the attachment piece 14, a connection 15 for the middle side member portion 9 which is not shown in FIG. 2 is evident.

The middle cross member 11 is composed of two roll-formed profiles 16, 17 each with hat-shaped cross section, which are welded to one another along their longitudinal edges. The rear cross member 10 is also put together from two roll-formed profiles, which here form a cross section that is open towards the back. This cross member is complemented into a hollow profile through a body plate only at a later stage of production.

Figure 3:
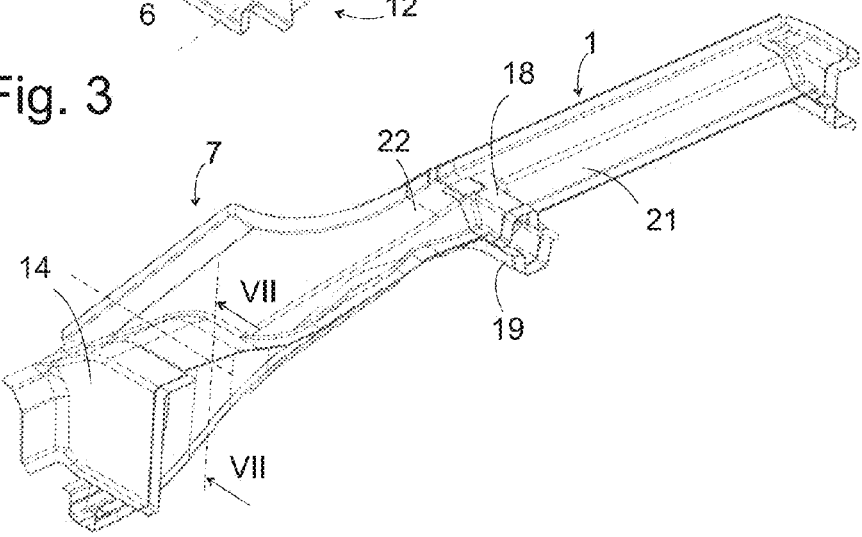
FIG. 3 shows the side member of the substructure from FIG. 2.

FIG. 3 shows the rear side member portion 1 without the cross members 10, 11, 12 in order to make possible a distinction between these and the attachment pieces of the rear side member portion 1 provided for their fastening. The middle cross member 11 is assigned two attachment pieces 18, 19 here, each of which at their distal end have a hat-shaped cross section that is complementary to the rolled profiles 16, 17 and which are welded together both on one another as well as at an inner flank 21, a top side 22 and a bottom side of the side member portion 1 which is not visible in the figure.

FIG. 4 shows the rear side member portion 1 from FIG. 3 in a partially expanded view, broken down into an upper shell 23 and an assembly 24. The upper shell 23 includes a deep-drawn front portion 25, which has to be assigned to the transmission portion 7 of the side member, and a roll-formed rear portion 26, which belongs to the rear side member portion 1. The portions 25, 26 are welded to one another at the height of the attachment piece 18, wherein the flanges which overlap one another and are welded to one another of the front and of the rear portion 25, 26 are largely concealed by the attachment piece 18. The assembly 24 likewise includes a roll-formed rear portion 27 as part of the rear side member portion 1 and a channel-like deep-drawn front portion 28 as part of the transition portion 7, which are welded together to a lower shell 20 approximately adjacently to the attachment piece 19.

The distance between the portions 25, 28 increasing towards the front is filled out by two deep-drawn wall parts 29, 30 of the assembly 24. The wall parts 29, 30 each have an approximately rectangular cutout 31 on its front edge, which is formed in order to receive the roll-formed profile 13 of the cross member 12. Since the attachment piece 14 covers the lateral end of the heel plate 6, the cross member 12 has to be positioned between the upper shell 23 and the assembly 24 and fastened before both are joined and welded together along flange 32, 33 of the roll-formed rear portions 26, 27 and 34, 35 respectively of the front portion 25 and the wall parts 29, 30. Because of this, the distance between the side members is determined before attaching the cross members 10, 11.

The attachment pieces 18, 19 for fastening the middle cross member 11 project towards the vehicle middle to a different extent so that the middle cross member 11 following the joining of the upper shell 23 to the assembly 24 can be placed on to the attachment pieces 18, 19 from the top and welded to these.

FIG. 5 shows the assembly 24 from another perspective, seen from the outside of the vehicle. The joining location between the roll-formed rear portion 27 and the wall parts 29, 30 as well as multiple components laterally joined to the outer wall part 30 or the front portion 28, namely a substantially horizontal plate 37 with receiving holes 38, a likewise substantially horizontal adapter plate 39, which carries a fastening element 40 for a link of the axle 3 (a second fastening element 41 is provided in the deep-drawn front portion 28) as well as a substantially vertical plate 42, which bridges the difference in height between the plate 37 and the adapter plate 39 and stiffens these in that it is welded to both, is clearly visible.

Figure 6:
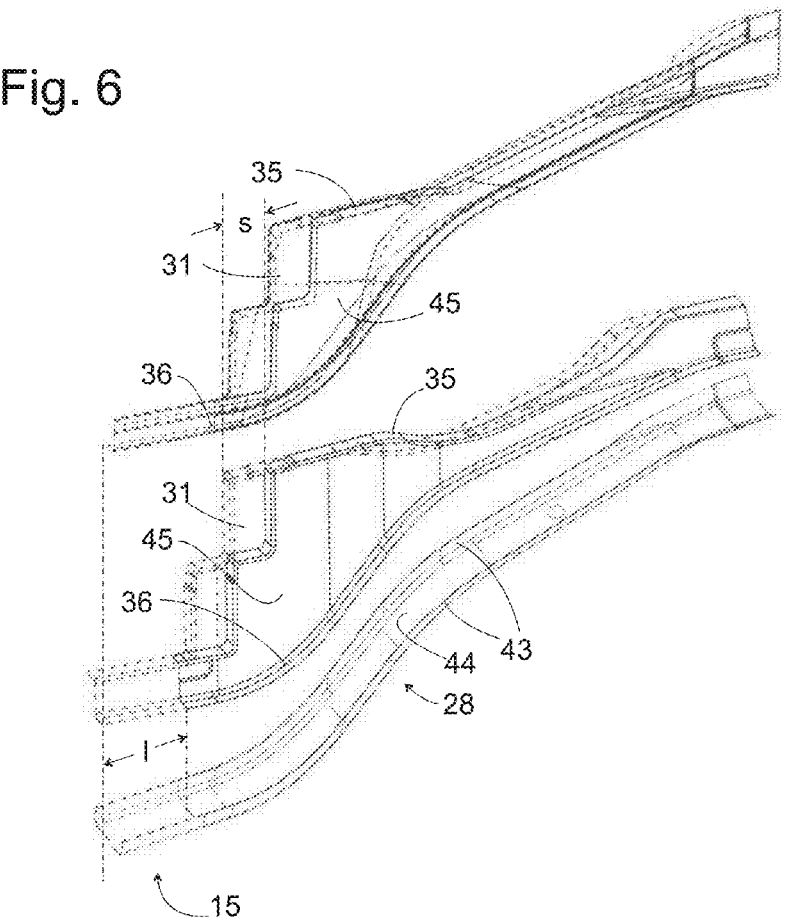
FIG. 6 shows an expanded representation of components of the lower assembly.

FIG. 6 shows the assembly 24 in an expanded representation. Here it is evident that the front portion 28 has a substantially U-shaped cross section with two lateral legs 43 and a bottom wall 44 connecting the legs 43, and that the wall parts 29, 30 each have an upright wall surface 45, from the upper edge of which the flanges 35 are each angled in opposite directions, whereas on the lower edge of the wall surfaces 45, angled flanges 36 run towards one another.

Figure 7:
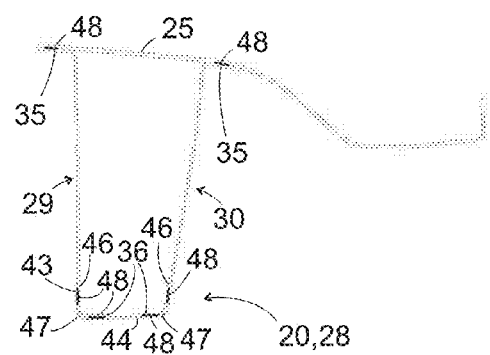
FIG. 7 shows a section along the plane VII-VII from FIG. 3.

FIG. 7 shows a cross section through the transition portion 7 of the side member along the plane designated VII-VII in FIG. 3. The diverging flanges 35 on the upper edges of the wall surfaces 45 are welded to the upper shell 23 on the front portion 25; the converging flanges 36 lie against the bottom wall 44 and the lower edge regions 46 of the wall surfaces 45 adjoining the flanges 36 contact the legs 43. The front portion 28 is thus reinforced by a material layer of the wall parts 29 over almost its entire cross section. Since the material doubling in each case extends on both sides of a curvature zone 47 running between the legs 43 and the bottom wall 44 and the front portion 28 is connected to the wall parts 29, 30 through spot welds 48 on both sides of the curvature 47, the side member is effectively stiffened above all in its lower region even with low wall thickness of the portions 25, 28 and wall parts 29, 30, and therefore highly loadable despite small cross section.

The construction of the side members from formed parts 9, 25, 26, 27, 28, 29, 30 explained above additionally facilitates the production of different body types, which differ in the length both of the passenger cell 5 and also of a loading space 8 following behind the same (see FIG. 1). Since the roll-formed rear portions 26, 27 are available as endless material, different lengths of the loading space or different values of the tail overhang d1 (see FIG. 1) can be realized in a simple manner in that the portions 26, 27 are cut off the endless strip in the respective length required. However, in order to be able to also vary the axle distance d2 and—via the position of the heel plate 6—the length of the passenger cell 5 and maintain balanced proportions of the body to suit a changed tail overhand d1, different models of the front portions 25, 28 and wall parts 29, 30 are provided here.

FIG. 6 shows, each superimposed on one another, two different models of the front portion 28 and the wall parts 29, 30 of the assembly 24, wherein the longer model in each case is drawn with interrupted lines. The two models of the front portion 28 merely differ in the length of the connection 15 for the middle side member portion 9, which is enlarged in the case of the longer model by I. Both models of the front portion 28 can therefore be cost-effectively produced in that cuts of model-specifically different length each are deep-drawn at least partially with same forming tools across models.

In the case of the wall parts 29, 30, the lower flanges 36 are identical in shape each in the case of both shown models and merely extend by the distance I further towards the front in the case of the longer model in order to continue the stiffening through material doubling to as far as the front connection 15. The upper flanges 35 and the cutout 31 receiving the rolled profiles 13 are shifted towards the front by a distance s in the case of the longer model while maintaining their shape, which distance s can be selected shorter, equal or longer than the length difference I. The lower flanges 36 are formed and trimmed on the different models of all parts 29, 30 independently of the values of s and I, with a same tool set; only during the molding-on of the upper flanges 35 are specific tools employed depending on the value of s.

In that the values of I and s can be determined independently of one another, the position of the heel plate 6 and the axle distance d2 can each be varied independently of one another; in the case of the longer one of the two models shown in FIG. 6 the axle distance d2 is larger by I than with the shorter model, while the distance of the heel plate 6 from the rear wheel axle 3 is enlarged by s, and the length of the passenger cell 5 is consequently enlarged by I-s.

Figure 8:
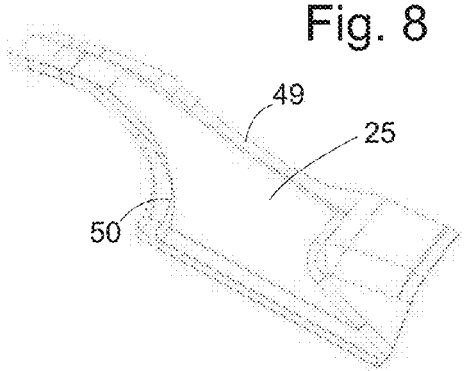
FIG. 8 shows a deep-drawn part of the upper shell.

Corresponding to the different models of the front portion 28 and of the wall parts 29, 30 of the assembly 24, different models of the front portion 25 have to be also provided for the upper shell 23. Two such models of the front portion are shown superimposed in FIG. 8. Here it is also easily evident that two sets of deep-drawing tools are sufficient in order to form any number of different length models of the front portion 25, namely a set for forming a flange 49 that is complementary to the upper flange 35 of the inner wall part 29 and the surface bearing against the flange 35 of the outer wall part 30, as well as a set for forming a flange 50 on an edge of the front portion 25 located opposite the flange 49, which is provided for fastening to a wheel housing.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents

The invention claimed is:

1. A substructure for a motor vehicle with a first side member comprising a first shell and a second shell configured to cross a rear axle and to extends at least as far as under a passenger cell, wherein a transition region between the rear axle and the passenger cell includes at least one wall part fastened to the upper and the lower shells in a material-doubling manner.

2. The substructure according to claim 1, wherein at least one of the first and second shells and the at least one wall part each have an elongated curvature zone, and wherein the wall part is fastened to the shell on both sides of the curvature zone.

3. The substructure according to claim 2, wherein the at least one shell has a U-shaped cross section with two legs and a bottom wall connecting the legs, and wherein the curvature zone of the at least one shell extends between one of the legs and the bottom wall.

4. The substructure according to claim 2, wherein the at least one wall part comprises an upright wall surface and flanges angled from the upright wall surface on an upper and a lower edge in opposite directions, and wherein the curvature zone of the at least one wall part extends between the upright wall surface and one of the flanges.

5. The substructure according to claim 4, wherein the at least one shell is a lower shell (20) and a lower one of the two flanges slopes in vehicle longitudinal direction towards the front.

6. The substructure according to claim 1 further comprising a heel plate joined to a front edge of the at least one wall part.

7. The substructure according to claim 1, wherein the first shell comprises at least one deep-drawn part on which the wall part is fastened.

8. The substructure according to claim 7, wherein the first shell further comprises at least one roll-formed part which is oriented in vehicle longitudinal direction.

9. The substructure according to claim 8, wherein the roll-formed part is joined to a rear connection of the at least one deep-drawn part and is configured to extend behind the rear axle.

10. The substructure according to claim 8, wherein the second shell comprises a deep-drawn part and a roll-formed part, and wherein the roll-formed parts of the first shell and the shell are connected into a hollow profile.

11. The substructure according to claim 8, wherein the roll-formed part is joined to a front connection of the deep-drawn part and extends under the passenger cell.

12. The substructure according to claim 1, wherein a second side member is formed in mirror image with regard to the first side member and the side members are connected with at least one cross member.

13. The substructure according to claim 12, wherein the at least one cross member are formed from roll-formed parts.

* * * * *